United States Patent [19]
Patterson

[11] Patent Number: 5,644,673
[45] Date of Patent: Jul. 1, 1997

[54] OPTICAL-FIBER-CABLE TO BULKHEAD CONNECTOR

[75] Inventor: Richard Joseph Patterson, Medford, N.J.

[73] Assignee: Lockheed Martin Corp., Moorestown, N.J.

[21] Appl. No.: 586,097

[22] Filed: Jan. 16, 1996

[51] Int. Cl.⁶ .................................................. G02B 6/00
[52] U.S. Cl. ........................... 385/138; 385/76; 385/77; 385/81; 385/87; 385/88; 385/139
[58] Field of Search ......................... 385/53, 60, 66, 385/76, 77, 78, 81, 86, 87, 88, 92, 138, 139

[56] References Cited

U.S. PATENT DOCUMENTS

| | | | |
|---|---|---|---|
| 4,679,895 | 7/1987 | Huber | 385/87 |
| 4,696,537 | 9/1987 | Bauer et al. | 385/87 X |
| 4,708,427 | 11/1987 | Ejiri et al. | 385/87 X |
| 4,730,890 | 3/1988 | Kashimura et al. | 385/87 X |
| 5,062,683 | 11/1991 | Grois et al. | 385/87 |
| 5,140,661 | 8/1992 | Kerek | 385/81 |
| 5,166,997 | 11/1992 | Norland et al. | 385/87 |
| 5,202,942 | 4/1993 | Collins et al. | 385/87 |
| 5,224,187 | 6/1993 | Davidson | 385/87 |
| 5,283,853 | 2/1994 | Szegda | 385/139 |
| 5,297,227 | 3/1994 | Brown et al. | 385/56 |
| 5,371,821 | 12/1994 | Szegda | 385/87 |
| 5,418,874 | 5/1995 | Carlisle et al. | 385/76 |

*Primary Examiner*—Brian Healy
*Attorney, Agent, or Firm*—W. H. Meise; C. A. Nieves; S. A. Young

[57] ABSTRACT

An optical fiber cable includes one or more optical fibers surrounded by a dielectric longitudinal strength member such as an aramid braid. The cable penetrates a bulkhead at a connector which couples tensile forces acting on the strength member to the bulkhead, to prevent breakage of the fiber(s). The connector includes two mating annular conical members which surround the optical fibers, with the strength braid flared and extending between the mating conical surfaces. The two cones are forced together by a bulkhead connector with a first thread and a second connector with a mating thread, thereby captivating the strength member to the bulkhead to resist tension. Concentric or annular grooves are formed in at least one of the mating conical surfaces to aid in gripping the slippery strength member.

17 Claims, 3 Drawing Sheets

5,644,673

1

OPTICAL-FIBER-CABLE TO BULKHEAD CONNECTOR

This invention was developed under Contract N00024-95-C-5159 with the Navy Department.

FIELD OF THE INVENTION

This invention relates to connectors by which optical fiber cables may be connected to a bulkhead.

BACKGROUND OF THE INVENTION

Optical fiber transmission is becoming more common, and finds use in vehicles such as aircraft. When used for important missions, as for example for flight control of aircraft, or for military communications purposes, it is important that connections between a fiber optic cable and a structural member, such as a bulkhead, remain intact notwithstanding severe shock and tensile loading.

In general, important communications or control functions will require a multiplicity of optical fiber paths. When such multiple optical fibers extend from one portion of a vehicle to another, each fiber must extend from a source "box" within the aircraft, through its side or "bulkhead," to the terminus box, and through its side or bulkhead to the interior of the terminus box. Other bulkheads may be traversed in going from one box to the other. In order to reduce weight, and to reduce the number of penetrations of the bulkheads and the concomitant connectors which must be provided, an optical fiber cable will often include a plurality or bundle of optical fibers, surrounded by a common tensile strength member such as an aramid fiber fabric. The aramid fabric may include only longitudinal filaments, or it may be a braid or weave. An inexpensive and convenient apparatus is desired which can readily provide reliable connection of such a cable to a bulkhead through which optical fiber paths pass.

SUMMARY OF THE INVENTION

A connector for connecting an optical cable to a fixed point or bulkhead. The optical cable includes at least one optical fiber and a longitudinal strength member, which may be, for example, a Kevlar fabric or braid. The connector includes a tube portion which is affixed to the bulkhead, and it also includes a male cone member with a bore, and a truncated female cone member which also defines a bore. The cones of the male and female members mate, and are forced together, and held to the tube portion. The optical fiber and the strength member pass through the bores of the female and male cone members, and the optical path continues through the tube of the bulkhead portion of the connector. The strength member of the optical cable departs from the optical fiber, and wraps through the interface between the mating cones. Improved resistance to tension on the optical cable is provided by circumferential grooves in one of the mating conical surfaces.

BRIEF DESCRIPTION OF THE DRAWING

FIG. 2b illustrates a bulkhead portion of the connector of FIG. 2a and associated portions, FIG. 2c illustrates a male cone portion of the connector of FIG. 2a, and FIGS. 2c, 2d is a view, partially cut away, which illustrates the female cone portion and compression portion of the connector of FIG. 2a.

DESCRIPTION OF THE INVENTION

Figure 1:
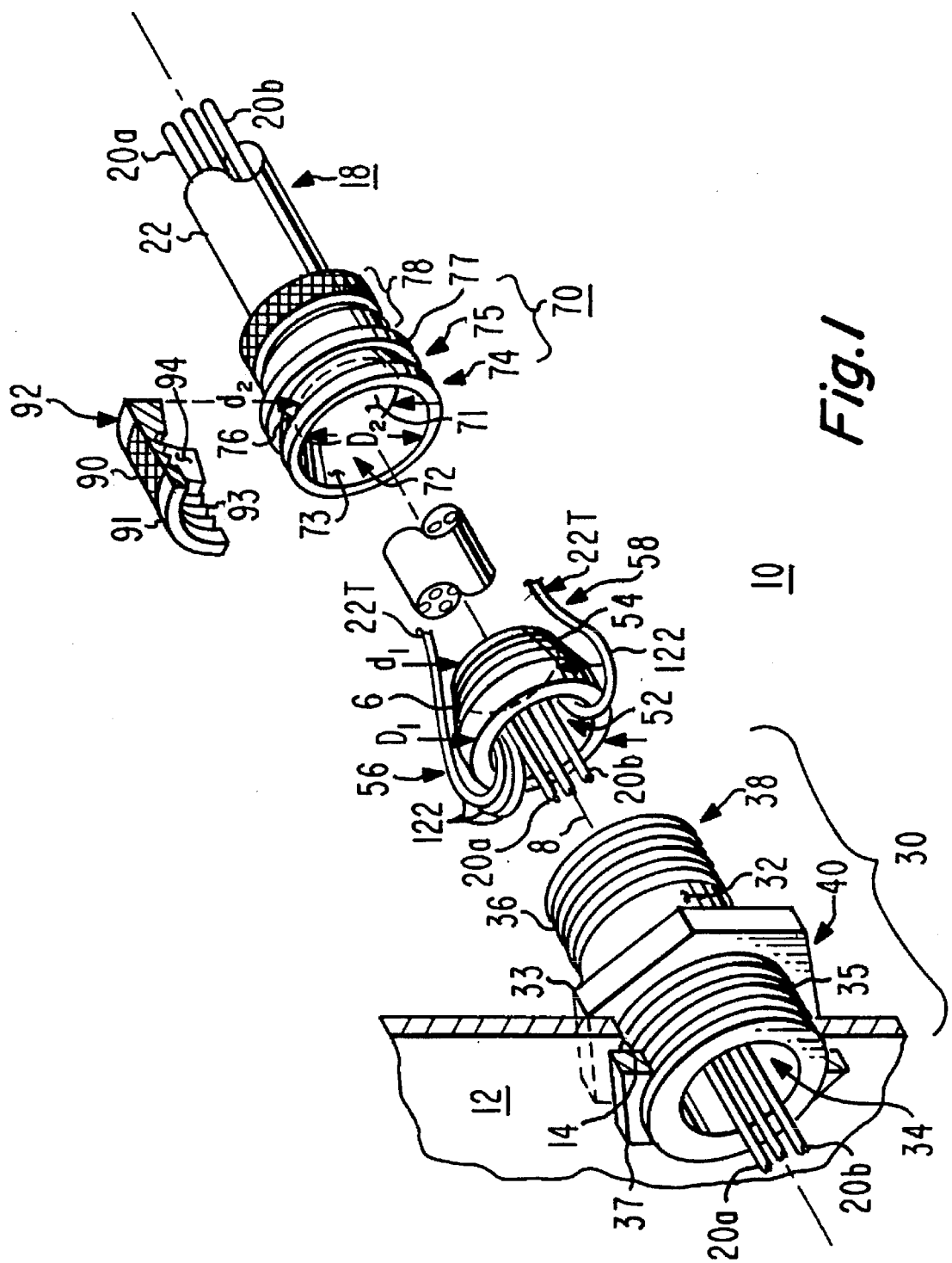
FIG. 1 is a perspective or isometric view, partially exploded, and partially cut away, of a first embodiment of a connector by which an optical cable may be affixed to and penetrate a bulkhead.

In FIG. 1, a connector assemblage 10 includes a fixed bulkhead or wall 12 which defines an aperture 14 centered on an axis 8. An optical cable designated generally as 18 includes a plurality of optical fibers 20a, ..., 20b, which are surrounded by a longitudinal strength member 22. Strength member 22 may be a braid or fabric of a high-strength polymer such as polyimide or aramid. In a preferred embodiment of the invention, the strength member 22 is DuPont KEVLAR. The purpose of the connector is to affix the optical cable in a manner which resists failure when tension is applied to the strength member, assuming of course that the tension is not so great as to stretch the strength member itself.

A bulkhead portion 30 of the connection arrangement 10 of FIG. 1 includes a bulkhead connector 32. Bulkhead connector 32 defines a through bore 34, and one end 40 is firmly affixed to the bulkhead 12 by an enlarged body portion 33 and a threaded portion 35 which protrudes through aperture 14, in combination with a mating jam nut 37. The optical fibers 20a, ..., 20b of cable 18 may be seen protruding through aperture 34 at the left of bulkhead portion 30. An exterior threaded portion 36 of bulkhead connector 32 lies adjacent an end 38 which is remote from the bulkhead 12. The threaded portion 36 is used to draw other connector portions into firm contact with bulkhead connector 32, as described in more detail below.

A male cone member 50 in FIG. 1 defines a through interior bore 52, which preferably has a diameter substantially equal to that of bore 34 of bulkhead connector 32. A portion of the optical fibers 20a, ..., 20b of optical cable 18 may be seen protruding from through bore 52 at the first or left axial end 56 of male cone member 50. The diameter of exterior surface 54 of cone member 50 at first end 56 is $D_1$, and the exterior diameter of surface 54 of cone member 50 decreases to a smaller diameter $d_1$ at second end 58.

A female cone member 70 in FIG. 1 includes a conical or frusto-conical interior surface 73, the small end of which communicates with a through bore 71. The larger inner diameter of female cone member 70 is $D_2$ at near end 74, and the diameter decreases to a smaller diameter $d_2$ where the female cone meets the through bore 71. The location at which the inner surface 73 of the female cone meets bore 71 is the second end 75 of the female cone member. It should be noted, however, that other portions, such as a retainer portion 77 and a further portion 78 may be monolithic with the female cone portion 70. Diameters $D_2$ and $d_2$ of female cone member 70 are selected to be substantially equal to diameters $D_1$ and $d_1$ of male cone member 50, respectively. The length of the interior conical surface 73 lying between first end 74 and second end 75 of female cone member 70 is selected in conjunction with the spacing between male cone member ends 56 and 58 so that the cones at least approximately mate when juxtaposed. The exterior surface 76 of female cone portion 70 is illustrated as being tapered or frusto-conical. Exterior surface 76 is a bearing surface which is used to urge the female portion 70 toward bulkhead connector 32, compressing male cone member 50 therebetween, as described below.

A segment of an annular compression member 90 is illustrated in FIG. 1, somewhat exploded away from female cone member 70 which it surrounds, for clarity of illustration. Compression member 90 has a near end 91 and a far end 92. An interior thread 93 is defined adjacent near end 91 of annular compression member 90, which mates with exterior thread 36 of bulkhead connector 32. An inwardly-projecting or interior bearing surface 94 adjacent far end 92 of compression member 90 is arranged to bear against exterior bearing surface 76 of female cone member 70. Interior bearing surface 94 is annular, and has a diameter which is less than the maximum diameter of exterior bearing surface 76. Consequently, when interior thread 93 of compression member 90 is screwed onto exterior thread 36 of bulkhead connector 32, bearing surface 94 is drawn axially toward bulkhead connector 32. The dimensioning is selected so that, as compression member 90 is rotated to screw threads 36 and 93 together, bearing surface 94 contacts bearing surface 76, drawing female cone member 70 toward bulkhead connector 32, with male cone member 50 lying between. The dimensioning also results in near end 56 of male member 50 contacting and bearing against bulkhead connector 32, and at least a portion of exterior surface 54 of male cone member 50 contacting and bearing against a portion of the conical interior surface 73 of female cone member 70 before the thread limits are reached. It is therefore possible to bind the male cone member between the female cone member and the bulkhead connector by tightening the threaded "screw" of the compression member.

As illustrated in FIG. 1, the optical fibers 20a, . . . , 20b of optical cable 18 pass in turn through the bore 71 of female cone member 70, the bore 52 of male cone member 50, and the bore of bulkhead connector 32. Thus, the optical path(s) established by the optical fiber(s) also extend therethrough. The strength member 22, however, does not extend through all the bores. More particularly, strength member 22 extends through the bores of male and female conical members 70 and 50. At the near end 56 of male cone member 50, the strength member departs from its position adjacent the optical fibers 20a, . . . , 20b, "wrap" around near end 56, and lie against the exterior surface 54 of the male conical member 50. In order to accomplish the wrap, the fibers 122 of the strength member must be unbraided or unravelled, if they are in the form of a fabric or braid. The purpose of the "wrap" is to provide a turn in direction of the fibers 122 of the strength member 22 adjacent to the captivation point. The fibers 122 of the strength member 22 are captivated, at or near a termination end 22T, between the conical exterior surface 54 of male cone member 50 and the mating interior conical surface 73 of female cone member 70 when the two surfaces tend to bear against each other as "screw" 90 is rotated.

While the above-described structure is functional, it has been discovered that, possibly due to an inherent slipperiness, or possibly a slight distortion of the fibers of the strength member 22 under heavy load, that the strength member slips well before the strength limits of the strength member are reached. According to an aspect of the invention, a plurality of grooves 6 are formed in the outer surface 54 of male cone member 50. These grooves are believed to slightly mold the fibers 122 of the strength member 22, to prevent them from pulling free under tension.

Figure 2A:
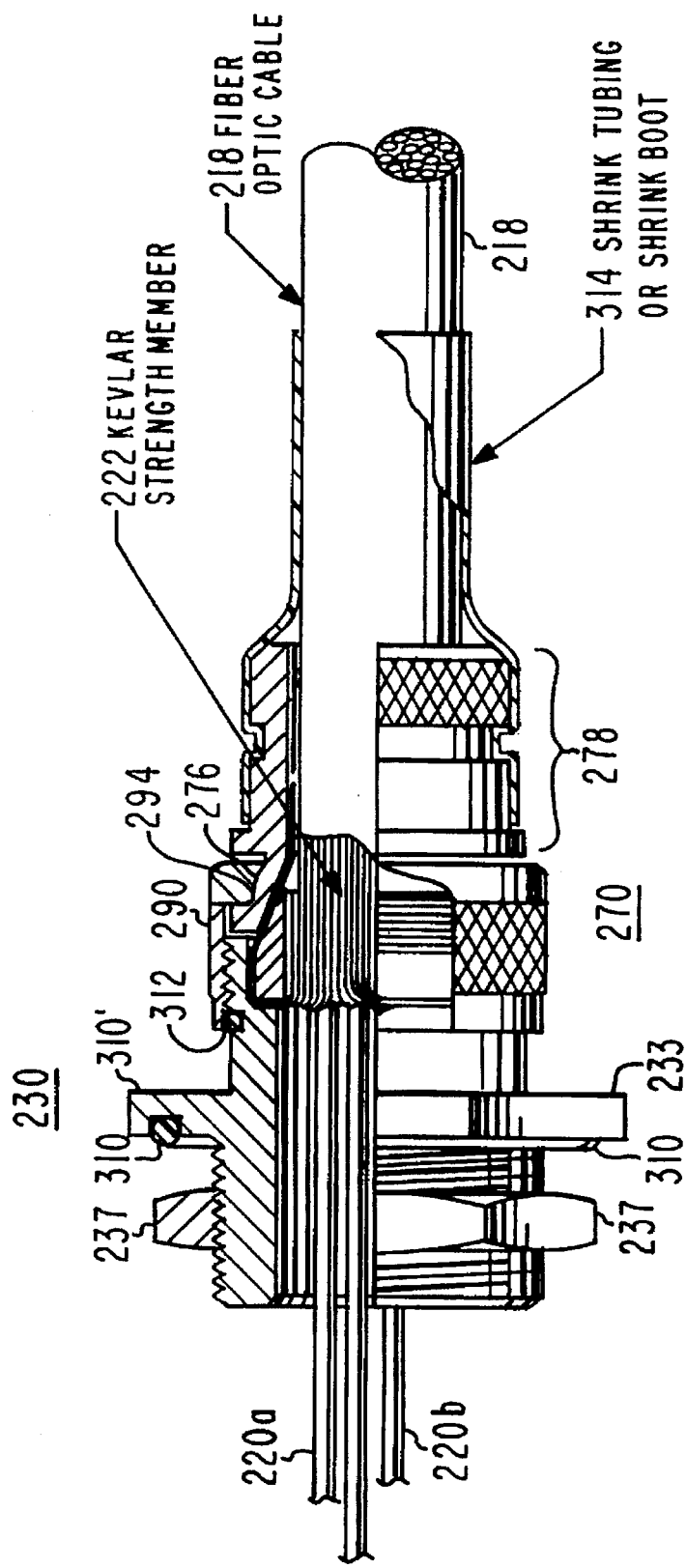
FIGS. 2a–d are an assembled elevation view of a second embodiment of a connector according to the invention.
Figure 2B:
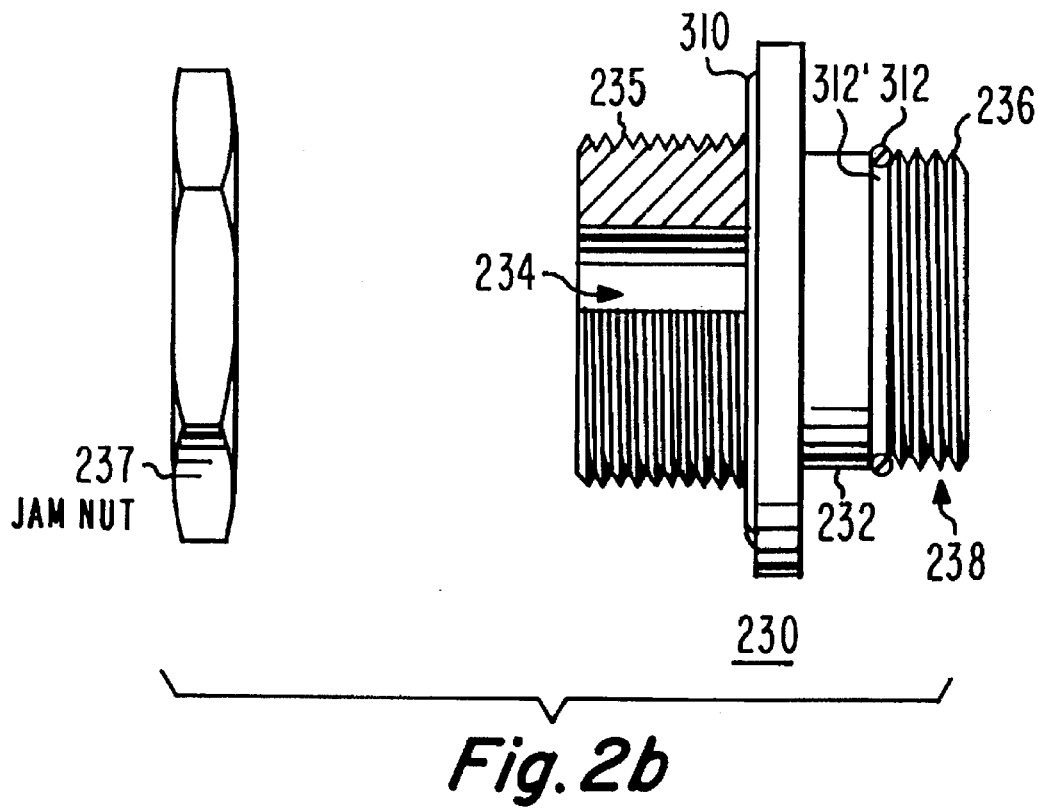
Figure 2C:
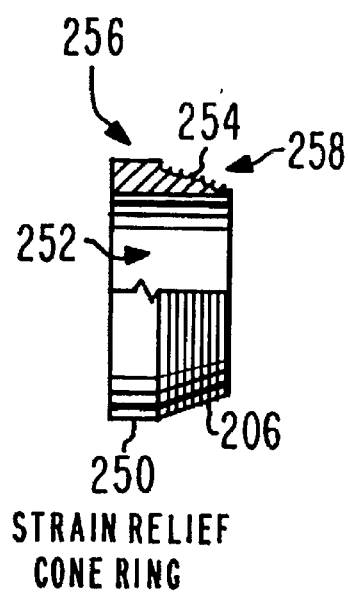
Figure 2D:
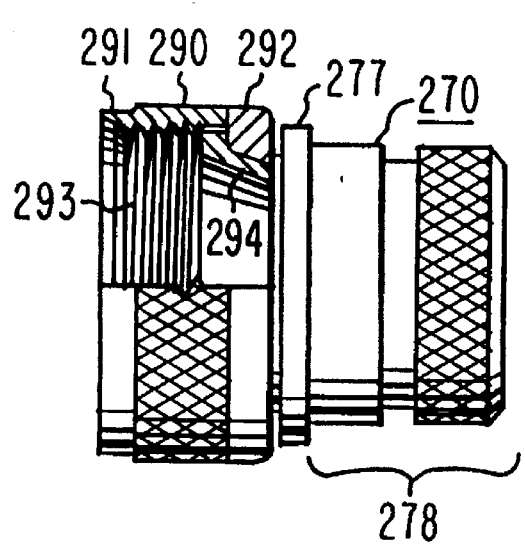

FIGS. 2a, 2b, 2c, and 2d illustrate another embodiment of the invention. Elements of the embodiment of FIGS. 2a, 2b, 2c, and 2d which correspond to equivalent portions of the arrangement of FIG. 1 are designated by like reference numerals in the 200 series. The arrangement of FIGS. 2a, 2b, 2c, and 2d differs from that of FIG. 1 chiefly in that O-rings 310 and 312 are provided for sealing the connector. More particularly, a groove 312' in the bulkhead-facing side of enlarged body portion 233 of FIGS. 2a and 2b is dimensioned to accept an O-ring 233, which, when the connector is installed, bears against the bulkhead, to seal aperture 14. Also, groove 312' is provided in the exterior surface of bulkhead portion 230 near the end of exterior threads 236, for sealing the threads. As illustrated in FIG. 1, shrink tubing 314 may be applied to the exterior of the optical cable 218 and to the portion 278 to seal the joint between the bulkhead connector and the cable. The pressure of tapered bearing surface 294 against tapered bearing surface 276 seals this avenue for ingress.

Thus, a connector assemblage (10) according to the invention comprises a bulkhead (12) defining an aperture (14) through which an optical signal path extends, and an optical cable (18) including at least one optical fiber (20a, . . . , 20b) and an longitudinal strength member (22) surrounding the optical fiber (20a). Also included is a bulkhead connector (30) including the following elements designated a, b, c, and d.

(a) A bulkhead member (32) defining a cylindrical bore (34) therethrough, and also defining an exterior thread (36) at a first end (38) thereof, the exterior thread (36) having root and crest diameters, the bulkhead member (32) being mechanically fastened to the bulkhead (12) at a second end (40) remote from the first end (38), with the bore (34) contiguous with the aperture (14) in the bulkhead (12), and with the bore (34) surrounding a portion of the optical signal path. As a result of the construction as so far described, tensile forces applied to the optical cable may tend to pull the optical fiber (20a) from the bore (34).

(b) An annular male cone member (50) defining a cylindrical bore (52) surrounding a portion of the optical fiber (20a) and of the longitudinal strength member (22), the male cone member (50) including an outer surface (54) which tapers from a larger diameter ($D_1$) to a smaller diameter ($d_1$), the larger diameter being located at a first end (56) of the male cone member (50), which first end (56) lies adjacent to the first end (38) of the bulkhead member (32), and the smaller diameter ($d_1$) of the male cone member being located at a second end (58) of the male cone member (50), which is remote from the first end (56) of the male cone member (50), the larger diameter ($D_1$) of the male cone member (50) being no greater than the root diameter of the exterior thread (36) of the bulkhead member (32), but great enough to bear against the first end (38) of the bulkhead member (32);

(c) An annular female cone member (70) defining a conical bore (72) surrounding a portion of the optical fiber (20a) and of the longitudinal strength member (22), the conical bore (72) of the female cone member (70) having an inner surface (73) which tapers from a larger diameter ($D_2$) at a first end (74) of the conical bore (72) to a smaller diameter ($d_2$) at a second end (76) of the conical bore (72), the first end (74) of the conical bore (72) of the female cone member (70) lying, when the connector assemblage (10) is assembled, nearer to the bulkhead member (32), and the second end (76) of the female cone member (70) being more remote from the bulkhead member (32), the larger diameter ($D_2$) of the conical bore (72) of the female cone member (70) being about equal to the larger diameter ($D_1$) of the male cone member (50), and the smaller diameter ($d_2$) of the conical bore (72) of the female cone member (70) being about equal to the smaller diameter ($d_1$) of the male cone member (50), and the lengths of the male (50) and female (70) cone members being selected so that, when juxtaposed, the male and female cones at least approximately mate, the male (50) and female (70) cone members, when so juxtaposed, having a terminal portion (22T) of the strength member (22) extending therebetween, the terminal portion (22T) of the strength member (22) being remote from that portion of the strength member (22) which extends through the conical bore (72) of the female cone member (70), the female cone member (70) also including a bearing surface (76) adjacent the second end (75), by which the female cone member (70) may be urged toward the bulkhead member (32).

(d) A compression member (90) associated with the female cone member (70), the compression member (90) defining first (91) and second (92) ends, and having an interior thread (93) adjacent the first end (91) which mates with the exterior thread (38) of the bulkhead member (30), the compression member (90) also including a rotatable bearing portion (94) coupled to the bearing portion (76) of the female cone member (70), so that tightening of the interior thread (93) of the compression member (90) onto the exterior thread (38) of the bulkhead member (32) tends to compress the female cone member (70) toward the male cone member (50), and to capture the terminal portion (22T) of the strength member of the optical cable (18) between the mating male and female cone members. With the construction as so far described, tensile forces may still tend to pull the strength member from between the cones because the strength member tends to slip on the cones, with the result that the tensile forces undesirably tend to be transferred to the optical fiber.

(e) the connector assemblage (10) further includes a plurality of concentric grooves (6) formed in one of (a) the outer surface (54) of the male cone member (50) and (b) the inner surface (73) of the female cone member (70), to provide a greater grip on the strength member, to thereby tend to prevent the strength member of the optical cable from pulling free of the mating surfaces of the male cone member and the female cone member.

Other embodiments of the invention will be apparent to those skilled in the art. For example, while the strength members are of nonconductive fiber, an additional conductive shield may be provided around the optical fibers or the strength member if desired.

What is claimed is:

1. A connector assemblage, comprising:

a bulkhead defining an aperture through which an optical signal path extends;

an optical cable including at least one optical fiber and an longitudinal strength member surrounding said optical fiber; and a bulkhead connector including:

(a) a bulkhead member defining a cylindrical bore therethrough, and also defining an exterior thread at a first end thereof, said exterior thread having root and crest diameters, said bulkhead member being mechanically fastened to said bulkhead at a second end remote from said first end, with said bore contiguous with said aperture in said bulkhead, and with said bore surrounding a portion of said optical signal path, whereby tensile forces applied to said optical cable may tend to pull said optical fiber from said bore;

(b) an annular male cone member defining a cylindrical bore surrounding a portion of said optical fiber and of said longitudinal strength member, said male cone member including an outer surface which tapers from a larger diameter to a smaller diameter, said larger diameter being located at a first end of said male cone member, which first end lies adjacent to said first end of said bulkhead member, and said smaller diameter of said male cone member being located at a second end of said male cone member, which is remote from said first end of said male cone member, said larger diameter of said male cone member being no greater than said root diameter of said exterior thread of said bulkhead member, but great enough to bear against said first end of said bulkhead member;

(c) an annular female cone member defining a conical bore surrounding a portion of said optical fiber and of said longitudinal strength member, said conical bore of said female cone member having an inner surface which tapers from a larger diameter at a first end of said conical bore to a smaller diameter at a second end of said conical bore, said first end of said conical bore of said female cone member lying, when said connector assemblage is assembled, nearer to said bulkhead member, and said second end of said female cone member being more remote from said bulkhead member, said larger diameter of said conical bore of said female cone member being about equal to said larger diameter of said male cone member, and said smaller diameter of said conical bore of said female cone member being about equal to said smaller diameter of said male cone member, and the lengths of said male and female cone members being selected so that, when juxtaposed, said male and female cones at least approximately mate, said male and female cone members, when so juxtaposed, having a terminal portion of said strength member extending therebetween, said terminal portion of said strength member being remote from that portion of said strength member which extends through said conical bore of said female cone member, said female cone member also including a bearing surface adjacent said second end, by which said female cone member may be urged toward said bulkhead member;

a compression member associated with said female cone member, said compression member defining first and second ends, and having an interior thread adjacent said first end which mates with said exterior thread of said bulkhead member, said compression member also including a rotatable bearing portion coupled to said bearing portion of said female cone member, so that tightening of said interior thread of said compression member onto said exterior thread of said bulkhead member tends to compress said female cone member toward said male cone member, and to capture said terminal portion of said strength member of said optical cable between said mating male and female cone members, but said tensile forces nevertheless tend to pull said strength member from between said cones, with the result that said tensile forces undesirably tend to be transferred to said optical fiber; said connector assemblage further comprising a plurality of concentric grooves formed in one of (a) said outer surface of said male cone member and (b) said inner surface of said female cone member, to provide a greater grip on said strength member, to thereby tend to prevent said strength member of said optical cable from pulling free of said mating surfaces of said male cone member and said female cone member.

2. A connector assemblage according to claim 1, wherein said optical cable comprises a plurality of optical fibers within said support member.

3. A connector assemblage according to claim 1, wherein said bulkhead member is part of a through connector, and said optical fiber extends through said aperture in said bulkhead.

4. A connector assemblage according to claim 1, wherein said strength member is made from a dielectric fiber.

5. A connector assemblage according to claim 4, wherein said strength member is a braid.

6. A connector assemblage according to claim 5, wherein said braid is made from aramid fiber.

7. A connector assemblage according to claim 4, wherein said strength member is made from aramid fiber.

8. A connector assemblage, comprising:

a bulkhead defining an aperture through which an optical signal path extends;

an optical cable including at least one optical fiber and an longitudinal strength member surrounding said optical fiber; and a bulkhead connector including:
(a) a bulkhead member defining a cylindrical portion defining a bore therethrough, and also defining at a first end thereof a threaded ring with a thread and a longitudinal thrust bearing surface, said bulkhead member being mechanically fastened to said bulkhead at a second end remote from said first end, with said bore contiguous with said aperture in said bulkhead, and said bore surrounding a portion of said optical fiber, whereby tensile forces applied to said optical cable may tend to pull said optical fiber from said bore;
(b) an annular male cone member defining a cylindrical bore surrounding a portion of said optical fiber, said male cone member having a conical outer surface which tapers from a larger diameter to a smaller diameter, said larger diameter being located at a first end of said male cone member which lies adjacent to said first end of said bulkhead member, and said smaller diameter being located at a second end of said male cone member which is remote from said first end of said male cone member, said first end of said male cone member also defining a first longitudinal thrust bearing surface for bearing against said longitudinal bearing surface of said bulkhead member;
(c) an annular female cone member defining a conical bore surrounding said optical fiber, said conical bore of said female cone member having a surface which tapers from a larger diameter at said first end to a smaller diameter at said second end, said first end of said female cone member lying, when said connector assemblage is assembled, nearer to said bulkhead member, and said second end being remote from said bulkhead member, the taper of said conical bore of said female cone member being about equal to said taper of said male cone member, said male and female cone member members having a flared portion of said strength member extending therebetween, said female cone member further defining a first longitudinal thrust bearing surfaces at said second end thereof;

a compression member including a bore surrounding said optical cable, its optical fiber and its longitudinal strength member, said compression member defining first and second ends, and having a threaded ring adjacent said first end which mates with said threaded ring of said bulkhead member, and also having a longitudinal thrust bearing surface at said second end which, when said connector assemblage is assembled, bears against said first thrust bearing surface of said female cone member, said first end of said compression member, when said connector assemblage is assembled, being adjacent to said bulkhead member, and said second end of said compression member being remote from said bulkhead member, said bulkhead member, male cone member, female cone member, and compression member being longitudinally dimensioned so that tightening of said threads of said compression member and said bulkhead member tends to capture said strength member of said optical cable between said mating male and female cone members, but said tensile forces nevertheless tend to pull said strength member from between said cones, with the result that said tensile forces are applied to said optical fiber; said bulkhead connector further comprising concentric grooves formed in one of said outer surface of said male cone member and said inner surface of said female cone member, to provide a greater grip on said strength member, to thereby tend to prevent said strength member of said optical cable from pulling free of said mating surfaces of said male cone member and said female cone member.

9. A connector assemblage according to claim 8, wherein said optical cable comprises a plurality of optical fibers within said support member.

10. A connector assemblage according to claim 8, wherein said connector assemblage is a through connector, and said optical fiber extends through said aperture in said bulkhead.

11. A connector assemblage according to claim 8, wherein said strength member is made from a dielectric fiber.

12. A connector assemblage according to claim 11, wherein said strength member is a braid.

13. A connector assemblage according to claim 12, wherein said braid is made from aramid fiber.

14. A connector assemblage according to claim 11, wherein said strength member is made from aramid fiber.

15. A connector assemblage according to claim 8, wherein said threaded ring of said bulkhead connector comprises an exterior threaded portion of said cylindrical exterior of said bulkhead connector; and said threaded ring of said compression member comprises an interior thread.

16. A connector assemblage according to claim 15, wherein said interior thread of said compression member is associated with an annular ring portion of said compression member surrounding the remaining portions of said compression member.

17. A connector assemblage according to claim 16, wherein said annular ring portion of said compression member is captivated to said remaining portions, but is free to rotate relative thereto.

* * * * *